United States Patent
Martelly

[11] Patent Number: 5,279,252
[45] Date of Patent: Jan. 18, 1994

[54] FUEL TANK LEVEL INDICATOR
[76] Inventor: Philip R. Martelly, 230 Maple Ave., Swansea, Mass. 02777
[21] Appl. No.: 46,258
[22] Filed: Apr. 5, 1993
[51] Int. Cl.$^5$ ............................................. G01F 23/58
[52] U.S. Cl. ........................................ 116/228; 73/322
[58] Field of Search ............................ 116/228; 73/322

[56] References Cited
U.S. PATENT DOCUMENTS

| | | | |
|---|---|---|---|
| 2,604,522 | 7/1952 | Monroe | 116/228 |
| 2,895,447 | 7/1959 | Burrell | 116/228 |
| 3,659,458 | 5/1972 | Bice et al. | 73/322 |
| 3,983,752 | 10/1976 | Holt | 116/228 |
| 4,526,033 | 7/1985 | Flider | 73/322 |
| 4,796,470 | 1/1989 | Lahde | 116/228 |
| 4,806,902 | 2/1989 | Gana | 116/228 |

FOREIGN PATENT DOCUMENTS

| | | | |
|---|---|---|---|
| 1813136 | 6/1970 | Fed. Rep. of Germany | 116/228 |
| 0491651 | 3/1954 | Italy | 116/228 |
| 0620293 | 11/1980 | Switzerland | 73/322 |

Primary Examiner—William A. Cuchlinski, Jr.
Assistant Examiner—Diego F. F. Gutierrez
Attorney, Agent, or Firm—William Nitkin

[57] ABSTRACT

A fuel tank level indicator for indicating at a surface when a fuel tank is filled with fuel, such indicator installed on a fuel inlet pipe and having a loop pipe in line with the inlet pipe with a riser pipe at the top of the loop and a float member disposed in the riser pipe to raise an indicator member above the surface when the loop pipe fills with fuel. The fuel is prevented from backing up the inlet pipe by a back flow preventor and some of the fuel then passes into the riser pipe, raising the float member and its attached indicator member above the surface where it is visible by the person entering fuel into the inlet pipe who will then see the indicator member and stop the flow of fuel.

3 Claims, 1 Drawing Sheet

FUEL TANK LEVEL INDICATOR

BACKGROUND OF THE INVENTION

1. Field of the Invention

The device of this invention resides in the area of fluid level indicators and more particularly relates to a device with means to indicate when a boat's fuel tank is full.

2. Description of the Prior Art

Prior art boat fuel tanks often have a fuel inlet on the boat's deck with no means to gauge when the fuel tank is full. When the tank is being filled with fuel, excess fuel beyond the fuel tank's capacity can often overflow onto the deck. Some boats have an overflow pipe that is positioned on the side of the hull and when the fuel tank is overfilled, the excess fuel is allowed to spill out into the water surrounding the boat which spillage causes undesirable pollution and creates a fire hazard.

SUMMARY OF THE INVENTION

It is an object of this invention to provide a device which is incorporated into the fuel inlet pipe extending down to a fuel tank such that as the fuel tank fills with fuel, the device visually indicates when the fuel tank is full without any of the fuel spilling onto the deck or into the surrounding water.

It is a further object of this invention to provide a fuel tank level indicator which is easy to utilize and convenient to maintain.

The device of this invention is used in conjunction with a fuel inlet pipe wherein the inlet pipe extends first down and then around in a reverse circular loop. The fuel passes through the loop on its way to the fuel tank. At the top of the loop is located a riser pipe which can be vented if desired and which extends up to the surface of the deck. At the top of the riser pipe is a movable indicator member, the movement of which is controlled by the upward and downward movement of a float rod which is attached at one end to the indicator member and at the other end to a ball float member which is disposed at the bottom of the riser pipe. The riser pipe is connected to an aperture defined at the top of the loop formed in the fuel inlet pipe. A back flow preventor is located in the fuel inlet pipe at approximately the same level as the level of the riser pipe's attachment to the loop. As fuel enters the fuel inlet pipe, it passes by the back flow preventor. When the fuel backs up in the fuel inlet pipe sufficiently to reach the level of the back flow preventor, the back flow preventor closes, thereby preventing any fuel from rising further up the fuel inlet pipe. The fuel, though, which by then has risen within the loop, passes up into the bottom of the riser pipe, causing the ball float member located at the bottom of the riser pipe to rise. Since the diameter of the riser pipe is narrower than the diameter of the fuel inlet pipe, only a small amount of fuel which moves by pressure past the backflow preventor is needed to cause the ball float member and its attached float rod to rise within the riser pipe and push the indicator member above the surface of the deck, visually indicating to the person filling the fuel tank that the fuel tank is full.

DESCRIPTION OF THE PREFERRED EMBODIMENT(S)

Figure 1:
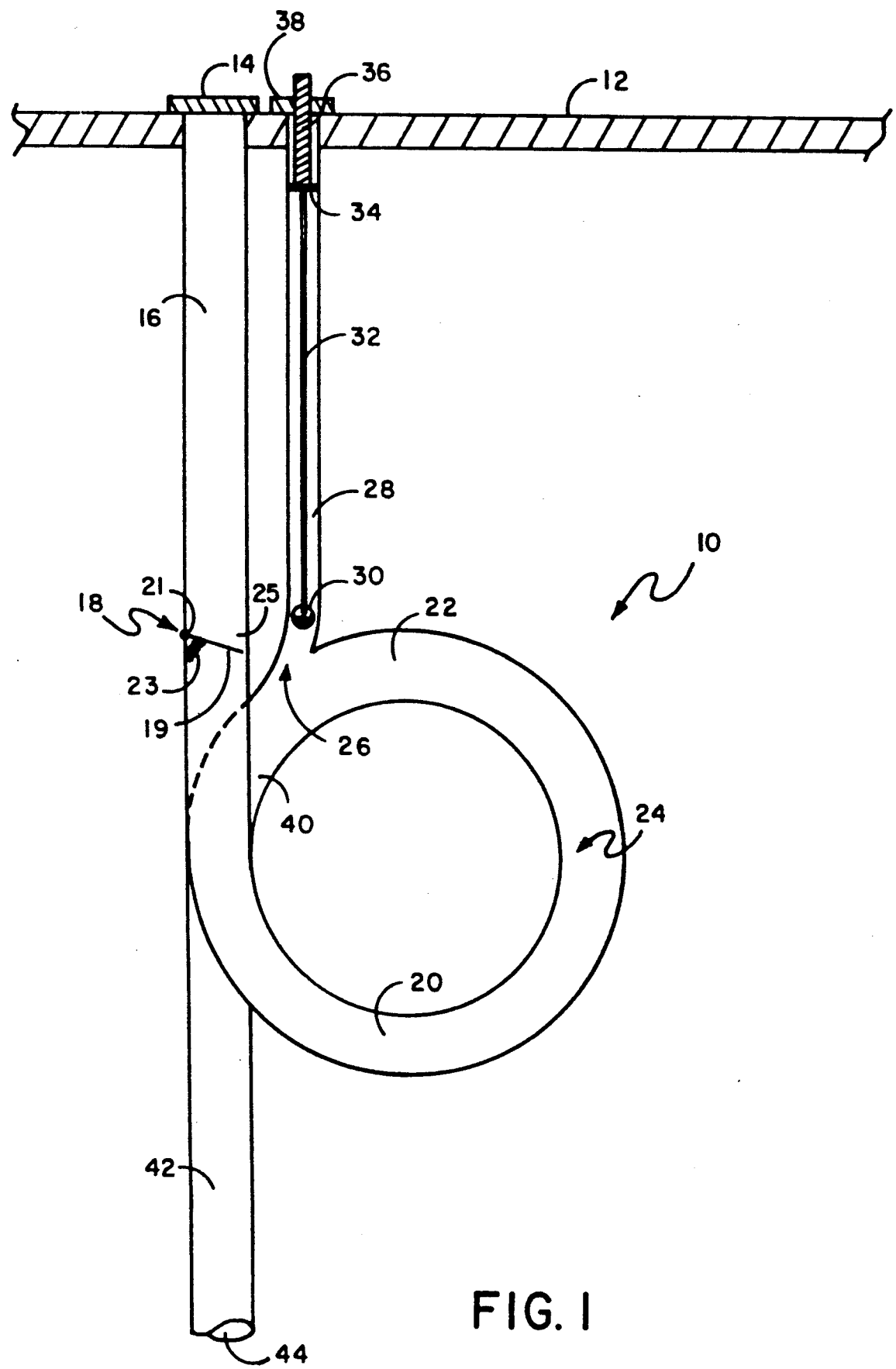
FIG. 1 illustrates a side view of the structure of the fuel tank level indicator of this invention.

FIG. 1 illustrates a side view of the structure of the fuel tank level indicator 10 of this invention wherein the surface of deck 12 of a boat is seen. It should be noted that although the structure has been illustrated in conjunction with a boat deck, the structure of this invention can be used in conjunction with other fuel inlet pipes which are disposed in similar relationship to any upper surface. The structure of this invention is not solely limited in its use to boat fuel inlet pipes.

Seen in FIG. 1 is cap 14 which covers the fuel inlet pipe. When fuel is to be entered into the fuel tank, cap 14 is first removed from the top of the upper portion of gas tank inlet pipe 16, and a typical fuel-dispensing nozzle, not shown, is inserted in inlet pipe 16 to dispense fuel therein. The fuel passes by back flow preventor 18 and into inlet pipe loop 24 which causes the fuel to go through inlet pipe loop 24 in a reverse circular path and continue downward in lower portion 42 of the fuel inlet pipe which extends downward to the fuel tank, not shown. The structure of this invention utilizes inlet pipe loop 24 in fluid communication with riser pipe 28 which extends upward from its point of attachment 26 located near the top of inlet pipe loop 24. After the tank is filled with fuel, the fuel backs up through lower portion 42 of the inlet pipe and passes around top portion 22 of inlet lower portion 42 of the inlet pipe and passes around top portion 22 of inlet pipe loop 24 and fills the bottom portion 20 of inlet pipe loop 24. Inlet pipe loop 24 fills with fuel and eventually inlet pipe 16 will also fill with fuel up to back flow preventor 18 which prevents any fuel from backing up into the upper portion of inlet pipe 16. Back flow preventor in one embodiment can have a flap 19 movable on hinge 21 urged by spring 23 against stop member 25. The force of fuel on the top of flap 19 opens back flow preventor 18, but fuel backing up inlet pipe 16 causes flap 19 to move upward against stop member 25 and stop any upward rising of fuel in inlet pipe 16. At this point a small amount of fuel, still entering under pressure and passing by back flow preventor 18, fills inlet pipe loop 24 and starts to progress up riser pipe 28. As the fuel rises in riser pipe 28, float member 30 floats and rises with the level of the rising fuel and causes the upward movement of float rod 32 which is attached to the float member. Float rod 32, in turn, is attached to indicator member 36 which is then raised by the upward movement of rising float rod 32 above indicator member deck mount 38 such that indicator member 36 pops up above the deck's surface and can be seen on the deck's surface, indicating to the person filling the fuel tank that the fuel tank has been filled. Upon seeing the indicator member above the deck's surface, the person then stops the flow of fuel. The indicator member can have imprinted thereon the letters "FULL" or can be colored red or some other bright color so that the indicator member can be easily seen when it pops up from indicator member deck mount 38. Means, such as baffle member 34, can be positioned at the bottom of indicator member 36 to prevent fuel from passing beyond the bottom of indicator member 36 and inadvertently spilling out onto the surface of the deck. By the use of the fuel level indicator device 10 of this invention, one can prevent inadvertent spillage of fuel on the deck and subsequently into the surrounding water to avoid pollution thereof.

Although the present invention has been described with reference to particular embodiments, it will be apparent to those skilled in the art that variations and modifications can be substituted therefor without departing from the principles and spirit of the invention.

I claim:

1. A fuel tank level indicator for indicating at a surface when a fuel tank is filled with fuel, comprising:
    a fuel inlet pipe having a diameter and an upper portion having a top and a lower portion leading to said fuel tank, said fuel inlet pipe having a fuel entrance defined at the top of said upper portion;
    a loop pipe having a top portion and a bottom portion, said fuel inlet pipe upper portion extending into the bottom portion of said loop pipe, said loop pipe rising upward and then downward to engage the lower portion of said fuel inlet pipe, said loop pipe having an aperture defined in its top portion;
    a riser pipe having a riser top portion and a riser bottom portion, said riser bottom portion attached to said loop pipe at said aperture at the top portion of said loop pipe, said riser pipe extending to said surface;
    a back flow preventor disposed in the upper portion of said fuel inlet pipe at approximately the same level of said riser pipe's attachment to said loop pipe;
    a float member disposed in the bottom portion of said riser pipe;
    a float rod having first and second ends disposed within said riser pipe, said first end of said float rod attached to said float member, said float rod extending upward toward said surface; and
    an indicator member attached to the second end of said float rod, said indicator member disposed below said surface but movable for a portion thereof to be visible above said surface when the fuel within said loop pipe and riser pipe rises, causing said float member and attached float rod and indicator member to also rise up, causing said indicator member to rise above said surface.

2. The device of claim 1 wherein the diameter of said riser pipe is narrower than the diameter of said fuel inlet pipe.

3. The device of claim 2 further including a baffle member disposed beneath said indicator member, said baffle member preventing fuel from passing by said indicator member to said surface.

* * * * *